(12) United States Patent
Ackva et al.

(10) Patent No.: US 7,535,146 B2
(45) Date of Patent: May 19, 2009

(54) BRUSHLESS SYNCHRONOUS MACHINE WITH EMBEDDED PERMANENT MAGNETS AND TRAPEZOIDAL ELECTROMAGNETIC FORCE

(76) Inventors: Ansgar Ackva, Gosbertsteige 10, 97082 Würzburg (DE); Grzegorz Ombach, Am Schenkenfeld 53, 97209 Veitshöchheim (DE)

( * ) Notice: Subject to any disclaimer, the term of this patent is extended or adjusted under 35 U.S.C. 154(b) by 356 days.

(21) Appl. No.: 11/489,068

(22) Filed: Jul. 19, 2006

(65) Prior Publication Data

US 2007/0018522 A1    Jan. 25, 2007

(30) Foreign Application Priority Data

Jul. 20, 2005    (EP) ................... 05015818

(51) Int. Cl.
*H02K 21/12*    (2006.01)
(52) U.S. Cl. ................................. 310/156.38
(58) Field of Classification Search ..............................
310/156.35–156.38, 216, 261, 162, 198
See application file for complete search history.

(56) References Cited

U.S. PATENT DOCUMENTS

| | | | |
|---|---|---|---|
| 5,866,964 A * | 2/1999 | Li .............................. | 310/198 |
| 6,208,054 B1 * | 3/2001 | Tajima et al. .................. | 310/46 |
| 6,242,837 B1 | 6/2001 | Matsunobu et al. .......... | 310/216 |
| 6,703,745 B2 | 3/2004 | Chu ....................... | 310/156.45 |
| 6,765,321 B2 * | 7/2004 | Sakamoto ................. | 310/49 R |
| 6,911,756 B1 | 6/2005 | Chang ................... | 310/156.01 |
| 7,332,837 B2 * | 2/2008 | Ward et al. ..................... | 310/54 |
| 2005/0035677 A1 * | 2/2005 | Evans et al. ............ | 310/156.35 |

FOREIGN PATENT DOCUMENTS

| | | |
|---|---|---|
| DE | 19851883 A1 | 5/2000 |
| EP | 0664600 A1 | 7/1995 |
| EP | 1420499 A1 | 5/2004 |
| EP | 1542335 A1 | 6/2005 |

OTHER PUBLICATIONS

Gan et al. "Design and Analysis of a New Permanent Magnet Brushless DC Machine" IEEE Transactions on Magnetics, vol. 36, No. 5 (pp. 3353-3356), Sep. 2000.
Gan et al. "A New Surface-Inset, Permanent-Magnet, Brushless DC Motor Drive for Electric Vehicles" IEEE Transactions on Magnetics, vol. 36, No. 5 (pp. 3810-3818), Sep. 2000.
Zeroug et al. "Analysis of Torque Ripple in a BDCM" IEEE Transactions on Magnetics, vol. 38, No. 2 (pp. 1293-1296), Mar. 2002.
Zhu et al. "Comparison of Halbach Magnetized Brushless Machines Based on Discrete Magnet Segments or a Single Ring Magnet" IEEE Transactions on Magnetics, vol. 38, No. 5 (pp. 2997-2999), Sep. 2002.
European Search Report for European Patent No. EP05015818 (1 page), Aug. 30, 2005.

* cited by examiner

*Primary Examiner*—Chandrika Prasad
(74) *Attorney, Agent, or Firm*—Baker Botts L.L.P.

(57) ABSTRACT

A brushless synchronous machine is energized by permanent magnets with a stator and a rotor. The rotor is supported within the stator to allow rotation. The rotor has a plurality of cutouts into which permanent magnets are embedded. An air gap is provided between the stator and the rotor. The outer contour of the rotors is formed such that the electromagnetic force induced by the individual stator tooth winding has a trapezoidal characteristic. The maximum value of the electromagnetic force is present uninterrupted in an electrical angle range of 30° to 90°.

20 Claims, 4 Drawing Sheets

BRUSHLESS SYNCHRONOUS MACHINE WITH EMBEDDED PERMANENT MAGNETS AND TRAPEZOIDAL ELECTROMAGNETIC FORCE

PRIORITY

This application claims priority from European Patent Application No. EP05015818, which was filed on Jul. 20, 2005, and is incorporated herein by reference in its entirety.

TECHNICAL FIELD

The invention relates to a brushless synchronous machine energized by permanent magnets with a stator and a rotor, with the rotor being supported to allow rotational movement within the stator, the rotor featuring a plurality of cutouts into which permanent magnets are embedded, and an air gap being provided between the stator and the rotor.

BACKGROUND

A synchronous machine energized by permanent magnets is known from DE 198 51 883 A1 with a laminated rotor core made of metal laminations into which the permanent magnets are embedded. With this known synchronous machine magnetic flux inhibitors are provided at least between a cutout for accommodating permanent magnets consisting of at least one magnetic disk and the air gap of the synchronous machine, which are implemented as slots or cutouts in the material. Furthermore the known synchronous machine contains means for creating a sine-wave energizing field in the air gap. This is achieved by the contour of the laminated rotor core facing towards the air gap being embodied such that the desired sine wave-shaped energizing field is produced.

SUMMARY

Using this prior art as its starting point, the object underlying the invention is to specify a brushless synchronous machine energized by permanent magnets with higher power and reduced quadrature inductance.

This object can be achieved by a brushless synchronous machine energized by permanent magnets comprising a stator and a rotor, wherein the stator is provided with a single-tooth stator winding which comprises a number of phase windings, the rotor is rotatable supported within the stator, the rotor comprises a plurality of cutouts in which permanent magnets are embedded, an air gap is provided between the stator and the rotor, the outer contour of the rotor facing towards the stator is formed such that electromagnetic force (EMF) induced in the stator winding has a trapezoidal characteristic and the maximum value of the electromagnetic force is present uninterrupted in an electrical angle range of 30° to 90°.

The stator may comprise three phase windings which are interconnected in a star configuration. The stator may comprise three phase windings which are interconnected in a triangular configuration. Each of the phase windings may comprise a number of coils connected in series, with each of the coils being wound in the sense of a single-tooth winding around one of the stator teeth. The permanent magnets can be embodied in a rectangular shape. The permanent magnets can be surrounded in each case on all sides by rotor material. The cutouts in a direction perpendicular to the radial direction can be larger in each case than the permanent magnets, the cutouts can be provided in the vicinity of the outer edge of the rotor and radially-aligned bars can be provided between adjacent cutouts. The radially-aligned bars may change in their radial outer end areas into outer bars running at right angles to the radially-aligned bars. The outer contour of the rotors can be defined by the following equation:

$$R(\alpha_m) = R_1 - \frac{G}{X_0 + X_1 \cos 1 p \cdot \alpha_m \pm X_3 \cos 3 p \cdot \alpha_m \pm \ldots \pm X_{11} \cos 11 p \cdot \alpha_m}$$

The particular advantages of a brushless synchronous machine energized by permanent magnets with the features specified above especially lie in the fact that, as a result of the electromagnetic force having a trapezoidal characteristic and the reduced quadrature inductance, the power of the machine compared to a known machine is increased by 12% and more. Furthermore the trapezoidal electromagnetic force ensures that only comparatively low torque fluctuations occur. Furthermore a synchronous machine with the features specified above, by comparison with machines in which the magnets are attached to the surface of the rotor, and by comparison with machines with permanent magnets embedded in the rotor and a round external contour of the rotor, has a lower click point. The phase windings can be applied simply, especially in the sense of a concentric winding, making it easy to undertake series production of a brushless synchronous machine in accordance with the invention.

Further advantages of the invention lie in the fact that, as a result of the permanent magnets being surrounded on all sides by rotor material, a good corrosion protection for the permanent magnets is produced and the permanent magnets, by comparison with machines in which the magnets are positioned on the surface of the rotor, are better protected against demagnetization. Furthermore a security ring which in practice surrounds the relevant permanent magnet, which with known machines is provided to prevent the permanent magnet becoming detached from the rotor, is no longer needed.

If the radially-aligned bars provided between adjacent permanent magnets are embodied with a thin profile, the flux distribution between two adjacent permanent magnets or poles is reduced. It must merely be ensured that the bars are thick enough to deal with the mechanical stresses arising during operation.

BRIEF DESCRIPTION OF THE DRAWINGS

Further advantageous features of the invention emerge from explanations of examples of them with reference to the figures. The drawings show FIG. 1 an exemplary embodiment of a brushless synchronous motor with permanent magnets in the rotor, FIG. 2 a cross-sectional diagram to illustrate the stator in the unwound state, FIG. 3 exemplary embodiments for the interconnection of the phase windings of the stator, FIG. 4 a cross-sectional diagram of a rotor segment to illustrate the outer contour of the rotor, FIG. 5 a diagram to illustrate the characteristic of the electromagnetic force EMF as a function of the electrical angle $\alpha_{el}$ and FIG. 6 a diagram to illustrate the output power curve of the synchronous machine as a function of the velocity of rotation of the rotor.

DETAILED DESCRIPTION

Figure 1:
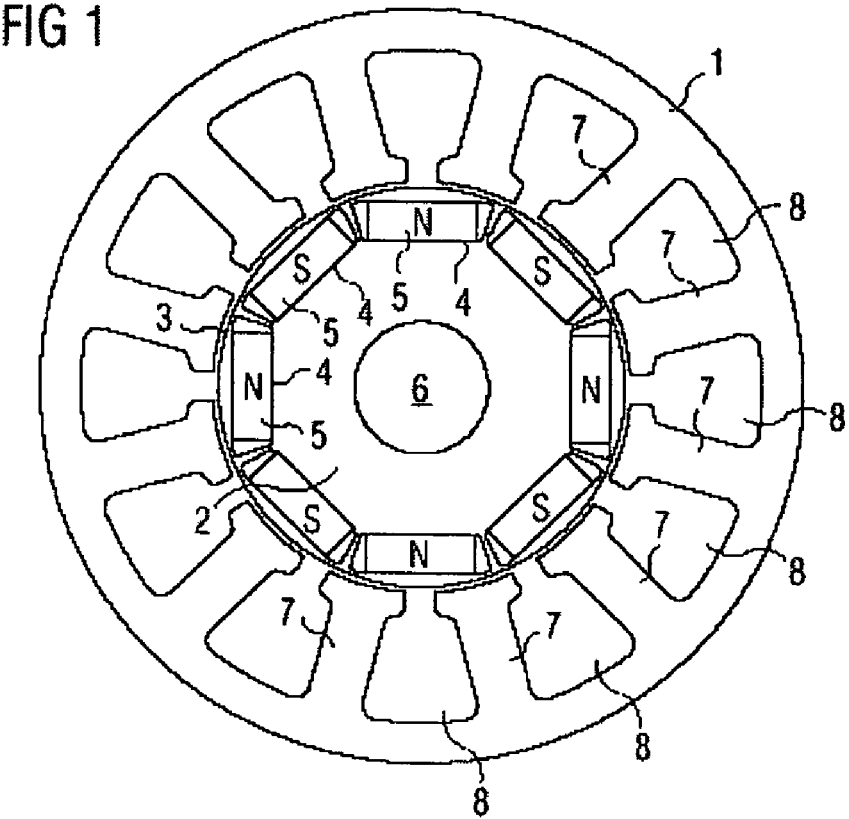

FIG. 1 shows an exemplary embodiment of a brushless synchronous motor. This has a stator 1 and a rotor 2. The rotor 2 is supported within the stator 1 to permit rotation, with there being an air gap 3 between the rotor and the stator.

The rotor 2 is provided with a plurality of cutouts 4 into which permanent magnets 5 are embedded. The permanent magnets preferably have a rectangular cross-section and are entirely surrounded by rotor material. The cutouts 4 are larger than the permanent magnets in each case in a direction at right angles to the radial direction. Furthermore the cutouts are located in the vicinity of the outer edge of the rotor 2 and are arranged so that in total they approximately form a ring around the rotor shaft 6. A radially-aligned bar 9 is provided between two adjacent cutouts 4 in each case, which will be explained in greater detail below with reference to FIG. 4. The permanent magnets 5 adjacent to each other in each case form the poles of rotor 2. North poles and South poles alternate, as is illustrated in FIG. 1 by the letters N and S.

The stator 1 has a plurality of stator teeth 7, between which stator grooves 8 are located. These stator teeth are provided with the stator winding, which consists of three phase windings for example.

Figure 2:
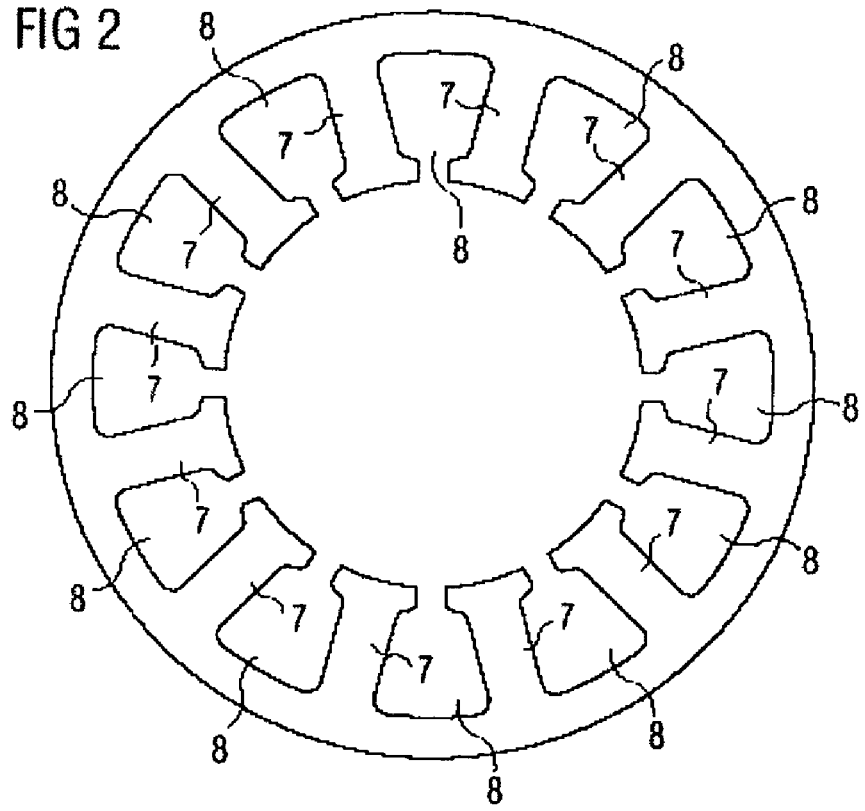

FIG. 2 shows a cross-sectional diagram to illustrate the stator 1 shown in FIG. 1. In the exemplary embodiment shown this has a total of twelve stator teeth 7 and consequently also twelve stator grooves 8. The stator teeth are provided with the stator winding which consists of three phase windings which are connected to each other in a specific manner. There are four coils belonging to each phase winding, with each coil being wound around one of the stator teeth in the sense of a single tooth winding.

Figure 3A:
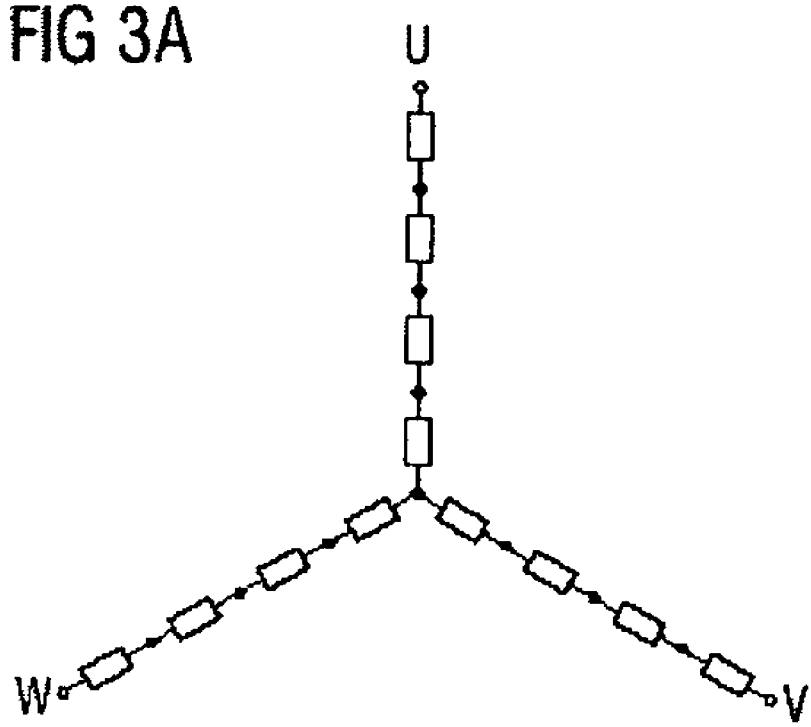
Figure 3B:
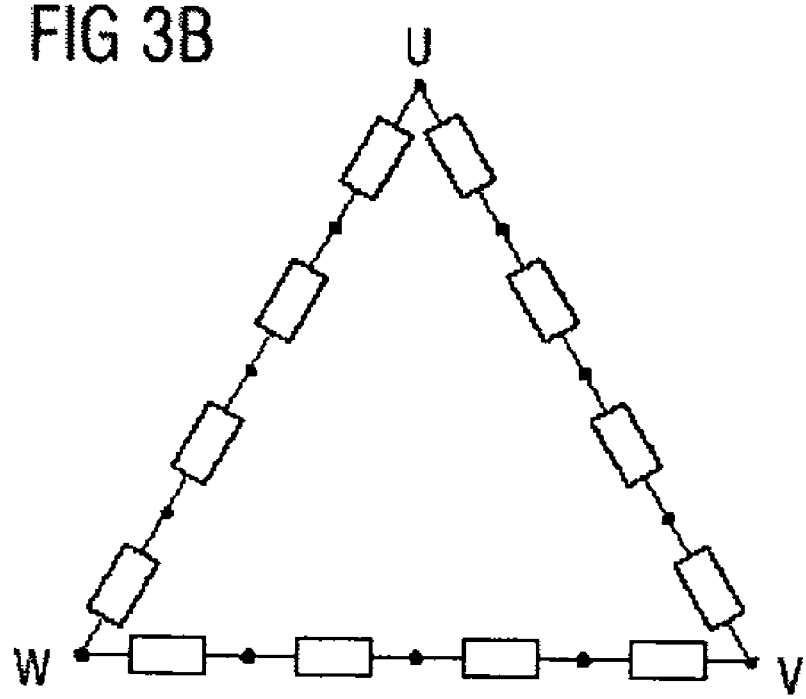

FIG. 3 shows exemplary embodiments of the interconnection of the phase windings of the stator. In accordance with FIG. 3*a* the three phase windings are connected to each other in a star configuration. In accordance with FIG. 3*b* the three phase windings are interconnected in a triangular configuration.

With most known permanent magnet-energized brushless synchronous machines the outer contour of the rotor is round.

In DE 198 51 883 A1 cited at the start of this document the outer contour of the rotor implemented in the form of a laminated rotor core is embodied such that a sine-wave energizing field is produced in the air gap between the rotor and the stator. With the solution described in DE 198 51 883 A1, by overall comparison with brushless synchronous machines with a round outer contour of the rotor, an increase in the torque and thereby of the rated power of the synchronous machine is obtained with the same rated current.

The inventors of the present invention have now recognized that a further increase in the rated output of the synchronous machine is achieved if the outer contour of the rotor facing towards the stator is formed such that the electromagnetic force EMF induced in the stator winding has a trapezoidal characteristic and the maximum value of the electromagnetic force is available uninterrupted in an electrical angular range of 30° to 90°. This type of formation of the outer contour of the rotor advantageously additionally achieves a reduction in the quadrature inductances of the machine. A trapezoidal curve of the electromagnetic force in the sense of the invention means that the electromagnetic force has a long rising edge, a long plateau area and a steep falling edge. The plateau area—as has already been specified above—is available uninterrupted in an electrical angular range $\alpha_{el}$ of 30° to 90°.

Figure 4:
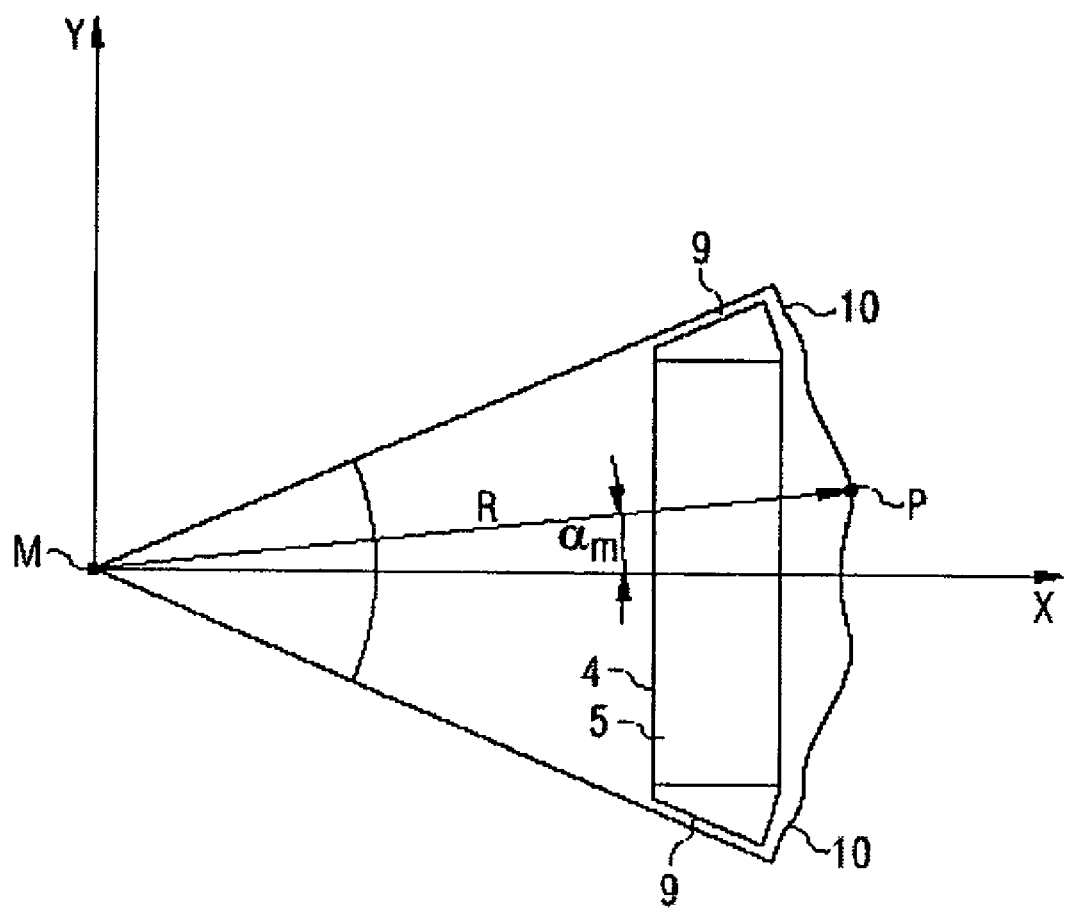

FIG. 4 shows a cross-sectional diagram of a rotor segment to illustrate the outer contour of the rotor in the area of this segment. In this figure the letter R indicates the distance between a point P lying on the outer edge of the rotor and the middle point M of the rotor shaft and with $\alpha_m$ indicating the angle which the straight line joining the points M and P makes with the straight line defining the middle of the pole. The outer contour of the rotor is described by the following equation:

$$R(\alpha_m) = R_1 - \frac{G}{X_0 + X_1 \cos 1p \cdot \alpha_m \pm X_3 \cos 3p \cdot \alpha_m \pm \ldots \pm X_{11} \cos 11p \cdot \alpha_m}$$

Where:
R1 the internal radius of the stator,
R,$\alpha_m$ the coordinates of a point in the spherical coordinate system lying on the outer edge of the rotor,
p the number of pole pairs,
G the smallest air gap between rotor and stator and
$X_0 \ldots X_{11}$ harmonic amplitudes.

It can also be seen from FIG. 4 that the cutout 4 in the figure extends upwards and downwards beyond the permanent magnets 5 and is delimited both upwards and also downwards by a thin radially-aligned bar 9 which is made of the rotor material, i.e. from metal laminations. Perpendicular or at a right angle to bar 9 and at its radial outer end a further bar 10 is provided. This further bar 10 delimits the projection of the cutout 4 beyond the permanent magnet 5 in the direction of the outer edge of the rotor and in this area simultaneously forms the outer edge of the rotor. Both bars have a thin profile. This result of this is that the flux distribution between two adjacent magnetic poles is reduced. It is merely necessary to ensure that said bars are thick enough to deal with the mechanical stresses arising during operation.

Figure 5:
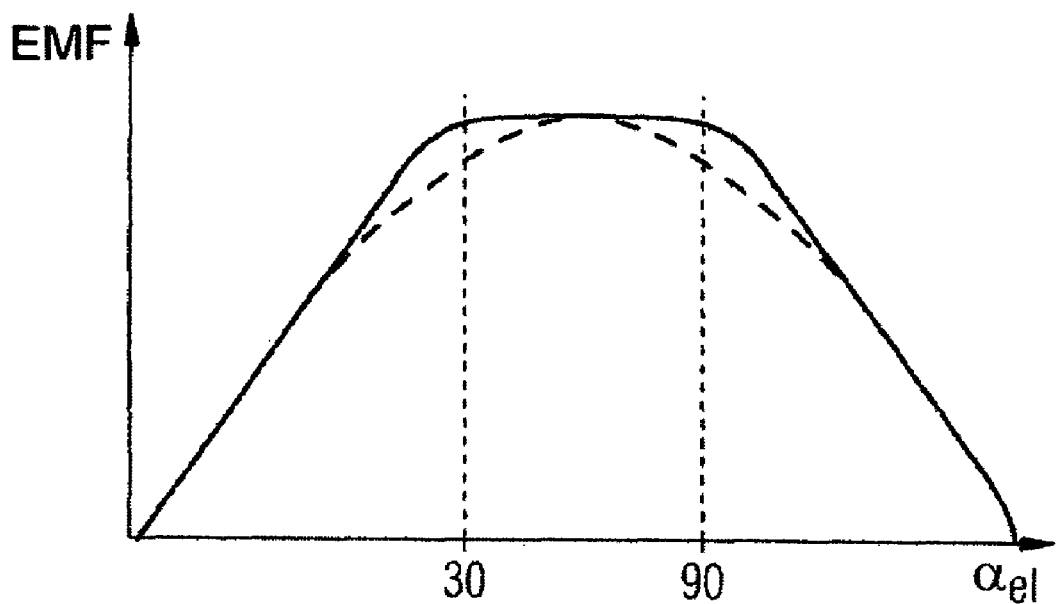

FIG. 5 shows a diagram to illustrate the characteristic curve of the electromagnetic force induced in a phase winding of the stator as a function of the electrical angle $\alpha_{el}$. The electrical angle $\alpha_{el}$ is defined as follows:

$$\alpha_{el} = p \cdot \alpha_m,$$

with $\alpha_{el}$ being the electrical angle, p the number of pole pairs and $\alpha_m$ the mechanical angle as is shown in FIG. 4.

In FIG. 5 the electromagnetic force EMF is plotted along the ordinate and the electrical angle $\alpha_{el}$ along the abscissa. The solid line in this figure depicts the curve of the electromagnetic force for a synchronous machine in accordance with the invention, whereas the dashed line depicts the electromagnetic force curve of a known machine. It can be seen that electromagnetic force for an inventive synchronous machine rises steeply, has a long plateau area which is available uninterrupted in an electrical angle range of 30° to 90° and then falls off steeply.

Figure 6:
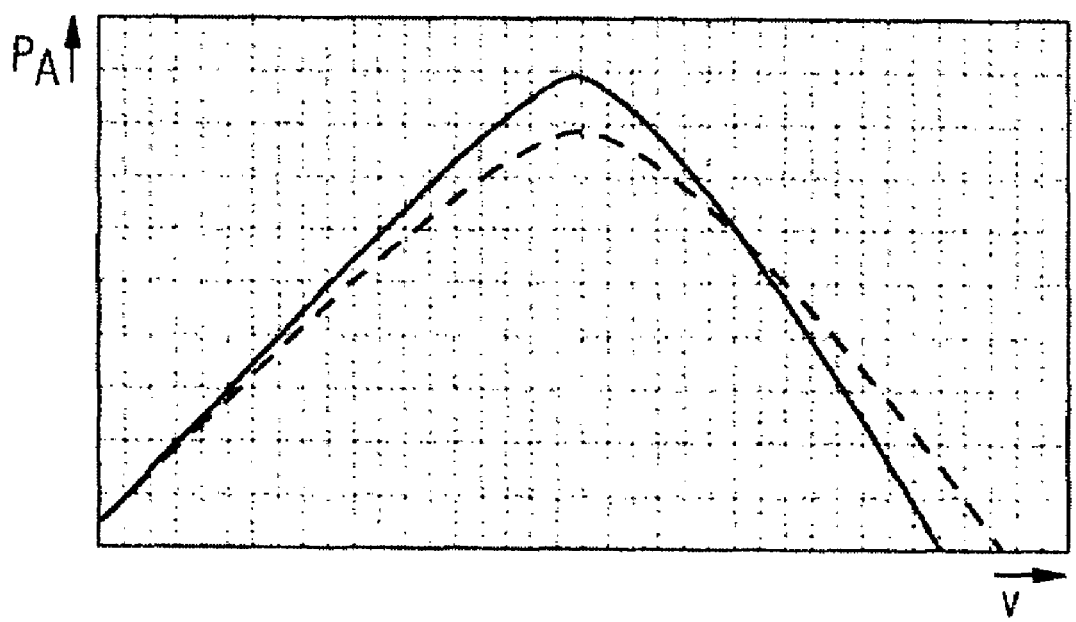

FIG. 6 shows a diagram to illustrate the curve of the output power $P_A$ of a synchronous machine as a function of the velocity of rotation v of the rotor. In this case the curve of the output power of an inventive synchronous motor is depicted by the solid line and the curve of the output power of a known synchronous machine by the dashed line. It can be seen that the output power of an inventive synchronous machine is greater over a wide range of speeds than the output power of a known synchronous machine. In particular the maximum value of the rated power for an inventive synchronous machine lies around 12% above the maximum value of the rated power of a known machine.

What is claimed is:

1. A brushless synchronous machine energized by permanent magnets, comprising a stator and a rotor, wherein
   the stator is provided with a single-tooth stator winding which comprises a number of phase windings,
   the rotor is rotatable supported within the stator,
   the rotor comprises a plurality of cutouts in which permanent magnets are embedded, and
   an air gap is provided between the stator and the rotor,
   the outer contour of the rotor facing towards the stator is formed such that electromagnetic force (EMF) induced in the stator winding has a trapezoidal characteristic and the maximum value of the electromagnetic force is present uninterrupted in an electrical angle range of 30° to 90°.

2. A brushless synchronous machine energized by permanent magnets according to claim 1, wherein the stator comprises three phase windings which are interconnected in a star configuration.

3. A brushless synchronous machine energized by permanent magnets according to claim 1, wherein the stator comprises three phase windings which are interconnected in a triangular configuration.

4. A brushless synchronous machine energized by permanent magnets according to claim 2, wherein each of the phase windings comprises a number of coils connected in series, with each of the coils being wound in the sense of a single-tooth winding around one of the stator teeth.

5. A brushless synchronous machine energized by permanent magnets according to claim 1, wherein the permanent magnets are embodied in a rectangular shape.

6. A brushless synchronous machine energized by permanent magnets according to claim 1, wherein the permanent magnets each are surrounded on all sides by rotor material.

7. A brushless synchronous machine energized by permanent magnets according to claim 6, wherein the cutouts in a direction perpendicular to the radial direction each are larger than the permanent magnets, the cutouts are provided in the vicinity of the outer edge of the rotor and radially-aligned bars are provided between adjacent cutouts.

8. A brushless synchronous machine energized by permanent magnets according to claim 7, wherein the radially-aligned bars change in their radial outer end areas into outer bars running at right angles to the radially-aligned bars.

9. A brushless synchronous machine energized by permanent magnets according to claim 1, wherein the outer contour of the rotors is defined by the following equation:

$$R(\alpha_m) = R_1 - \frac{G}{X_0 + X_1 \cos 1p \cdot \alpha_m \pm X_3 \cos 3p \cdot \alpha_m \pm \ldots \pm X_{11} \cos 11p \cdot \alpha_m}$$

wherein:
R1 is the internal radius of the stator,
$R, \alpha_m$ is the coordinates of a point in the spherical coordinate system lying on the outer edge of the rotor.
p is the number of pole pairs,
G is the smallest air gap between rotor and stator, and
$X_0 \ldots X_{11}$ are harmonic amplitudes.

10. A brushless synchronous machine energized by permanent magnets comprising:
a stator having a single-tooth stator winding which comprises a number of phase windings,
a rotor being rotatable supported within the stator and comprising a plurality of cutouts in which permanent magnets are embedded, and
an air gap between the stator and the rotor,
wherein the outer contour of the rotor facing towards the stator is formed such that electromagnetic force (EMF) induced in the stator winding has a trapezoidal characteristic and the maximum value of the EMF is present uninterrupted in an electrical angle range of 30° to 90°.

11. A brushless synchronous machine according to claim 10, wherein the stator comprises three phase windings which are interconnected in a star configuration.

12. A brushless synchronous machine according to claim 10, wherein the stator comprises three phase windings which are interconnected in a triangular configuration.

13. A brushless synchronous machine according to claim 11, wherein each of the phase windings comprises a number of coils connected in series, with each of the coils being wound in the sense of a single-tooth winding around one of the stator teeth.

14. A brushless synchronous machine according to claim 10, wherein the permanent magnets are embodied in a rectangular shape.

15. A brushless synchronous machine according to claim 10, wherein the permanent magnets each are surrounded on all sides by rotor material.

16. A brushless synchronous machine according to claim 15, wherein the cutouts in a direction perpendicular to the radial direction each are larger than the permanent magnets, the cutouts are provided in the vicinity of the outer edge of the rotor and radially-aligned bars are provided between adjacent cutouts.

17. A brushless synchronous machine according to claim 16, wherein the radially-aligned bars change in their radial outer end areas into outer bars running at right angles to the radially-aligned bars.

18. A brushless synchronous machine according to claim 10, wherein the outer contour of the rotors is defined by the following equation:

$$R(\alpha_m) = R_1 - \frac{G}{X_0 + X_1 \cos 1p \cdot \alpha_m \pm X_3 \cos 3p \cdot \alpha_m \pm \ldots \pm X_{11} \cos 11p \cdot \alpha_m}$$

wherein:
R1 is the internal radius of the stator.
$R, \alpha_m$ is the coordinates of a point in the spherical coordinate system lving on the outer edge of the rotor.
p is the number of pole pairs
G is the smallest air gap between rotor and stator, and
$X_0 \ldots X_{11}$ are harmonic amplitudes.

19. A brushless synchronous machine energized by permanent magnets comprising:
a stator having a single-tooth stator winding which comprises a number of phase windings,
a rotor being rotatable supported within the stator and comprising a plurality of cutouts in which permanent magnets are embedded, and
an air gap between the stator and the rotor,
wherein
the outer contour of the rotor facing towards the stator is formed such that electromagnetic force (LMF) induced in the stator winding has a trapezoidal characteristic and the maximum value of the LMF is present uninterrupted in an electrical angle range of 30° to 90°,
the permanent magnets each are surrounded on all sides by rotor material,
the cutouts in a direction perpendicular to the radial direction each are larger than the permanent magnets, the cutouts are provided in the vicinity of the outer edge of the rotor and radially-aligned bars are provided between adjacent cutouts, and wherein
the radially-aligned bars change in their radial outer end areas into outer bars running at right angles to the radially-aligned bars.

20. A brushless synchronous machine according to claim 19, wherein the stator comprises three phase windings which are interconnected in a star configuration or wherein the stator comprises three phase windings which are interconnected in a triangular configuration.

* * * * *